United States Patent [19]

Wells

[11] Patent Number: 4,737,074

[45] Date of Patent: Apr. 12, 1988

[54] WEAR RESISTANT HUB FOR WIND MACHINES

[75] Inventor: Dean A. Wells, Holtville, Calif.

[73] Assignee: International Frost Protection Company, Holtville, Calif.

[21] Appl. No.: 861,338

[22] Filed: May 9, 1986

[51] Int. Cl.[4] .............................................. F04D 29/08
[52] U.S. Cl. .................................. 416/102; 416/131; 416/148
[58] Field of Search ................... 416/102, 148, 131 R

[56] References Cited

U.S. PATENT DOCUMENTS

| | | | |
|---|---|---|---|
| 1,491,997 | 4/1924 | Messick | 416/131 X |
| 1,786,057 | 12/1930 | Fales | 416/148 X |
| 2,124,369 | 7/1938 | Everts | 416/19 |
| 2,422,558 | 6/1947 | Korff | 416/102 X |
| 2,484,291 | 10/1949 | Hays | 416/102 X |
| 3,302,867 | 2/1967 | Roffy | 230/134 |
| 3,575,530 | 4/1971 | Hall | 416/131 |
| 3,846,042 | 11/1974 | Keene | 416/110 |
| 4,045,147 | 8/1977 | Curp | 416/100 |
| 4,092,084 | 5/1978 | Barltrop | 416/102 |
| 4,131,391 | 12/1978 | Robinson | 416/140 |
| 4,148,594 | 4/1979 | Stafford | 416/102 X |
| 4,201,514 | 5/1980 | Heutter | 416/37 |
| 4,245,960 | 1/1981 | Matthews | 416/244 R |
| 4,353,681 | 10/1982 | Doman | 416/11 |
| 4,415,813 | 11/1983 | Carme | 290/44 |
| 4,449,889 | 5/1984 | Belden | 416/16 |
| 4,595,337 | 6/1986 | Crowe | 416/131 |

FOREIGN PATENT DOCUMENTS

| | | | |
|---|---|---|---|
| 999082 | 1/1952 | France | 416/131 |
| 532535 | 8/1955 | Italy | 416/102 |
| 23258 | 10/1969 | Japan | 416/102 |
| 4423258 | 10/1969 | Japan | 416/102 |
| 462037 | 3/1937 | United Kingdom | 416/19 |

*Primary Examiner*—Everette A. Powell, Jr.
*Attorney, Agent, or Firm*—Cahill, Sutton & Thomas

[57] ABSTRACT

A one piece fan blade for a wind machine is sandwiched between a hub and a plate, the fan blade and the hub and is secured thereto by a teeter pin extending through the bore from opposed passageways in the hub. The shaft is centered in the bore of the hub to permit tilting of the hub about an axis coincident with the teeter pin to an angle commensurate with the spacing intermediate the shaft and the bore. Apparatus at the extremities of the teeter pin reduce wear on the teeter pin retaining plates and contribute to lubrication of the opposed journals.

8 Claims, 1 Drawing Sheet

WEAR RESISTANT HUB FOR WIND MACHINES

The present application is related to a patent application entitled "Hub for Wind Machines", U.S. Ser. No. 684,094, filed on Dec. 20, 1984, now U.S. Pat. No. 4,595,337, a part interest of which is assigned to the present assignee.

The present invention relates to wind machines and, more particularly, to a wear resistant hub assembly for a wind machine.

Wind machines are used in citrus groves and like agricultural areas to prevent settling of cold air under certain climatic conditions. As is well known, cold air is more dense than warmer air and during a temperature drop, the cold air will tend to flow to low spots along the ground. If there is little or no prevailing wind, the pools of cold air will remain stagnant and draw heat from the surroundings. If the temperature of the cold air is low enough, frost damage to the trees and crop will occur.

One way of combating settling of cold air in orchards is that of forceably mixing upper layer warmer air with the cold air adjacent the ground. Such mixing can be brought about by pedestal mounted or otherwise raised wind machines which cause air flow in and through an orchard. Thereby, the wind machines cause circulation of air through the orchard, which circulates draws in warm air and prevents settling of cold air.

The propellers or fan blades of a wind machine are substantial in size and may vary in diameter between 11 and 17 or more feet. Such fan blades are reasonably but not perfectly statically and dynamically balanced. Moreover, the air foil and angle of attack from the hub to the tip of each blade of the fan blade are not aerodynamically perfect. These discrepancies are generally accepted in view of the extraodinary expenses attendant manufacture of fan blades of this size to near perfect balance and aerodynamic parameters.

The imperfections attendant a fan blade create various stresses at the junction between the fan blade and the rotatable shaft to which it is mounted. In example, it has long been known that a teeter structure must be employed in order to permit the fan blade to tilt in an effort to accomodate static, dynamic and aerodynamic imbalances; otherwise, the loads imposed upon the shaft would cause self-destruction or require such massive mounting mechanisms as to be totally economically unfeasible.

One of the problems attendant a fan blade for a wind machine is that of distributing stress loads between the fan blade center and each blade secured to the center. In U.S. Pat. No. 4,148,594 this problem is addressed by employing a plurality of decreasing length splice plates for securing each fan blade to a blade stub extending from the center. Tilting of the hub is accomodated by reducing the diameter of the rotatable shaft inward of the teeter pin and increasing the bore of the hub outward of the teeter pin. U.S. Pat. No. 1,491,997 describes a pivot axis for a propeller which is orthogonal to the axis of rotation of the propeller for the purpose of compensating for the gyroscopic effect in response to a change in direction of the axis of rotation of the propeller. U.S. Pat. No. 1,786,057 describes a ball and socket mounting for accomodating tilt of a turbine blade. U.S. Pat. No. 2,124,369 is directed to a single bladed propeller having the capability for forward or rearward tilt to vary the pitch. U.S. Pat. No. 2,422,558 is directed to a single bladed propeller incorporating a universal joint and a spring to bias the degree of tilt of the propeller. U.S. Pat. No. 2,482,291 includes an air compresser for compressing air in response to wind changes and commensurate responses of a wind rotor. U.S. Pat. No. 3,302,867 is directed to a means for removably keying a fan blade to a hub intermediate flexible retainers. U.S. Pat. No. 3,575,530 includes a multiple blade fan wherein each blade may have a different angle of attack. U.S. Pat. No. 3,586,042 is directed to a wind machine and illustrates a shaft mounted fan blade. U.S. Pat. No. 4,045,147 is directed to a means for tilting the turbine of a wind machine consonant with the terrain while the drive assembly is rotated about a vertical axis. U.S. Pat. No. 4,092,084, while directed to a rotor for an autogyro, illustrates structure for altering the angle of the blade assembly. Such change in angle of attack is accommodated by pivotally interconnecting the stubs of the blades with one another and the teetering hub. U.S. Pat. No. 4,131,391 is directed to a hub for a helicopter rotor having coning hinges securing the blades to the hub, which hub is secured to a rotating shaft through a teeter hinge. U.S. Pat. No. 4,201,514 is directed to a hub of a rotor for varying the angle of attack of the rotor blades in correspondence with the wind gradient in the vertical axis. U.S. Pat. No. 4,245,260 describes the attachment of a sheet metal fan to a hub by bending alternate segments of the hub radially outwardly into engagement with the periphery of the bore of the fan blade. U.S. Pat. No. 4,353,681 describes means for offsetting the yaw axis from the axis of rotation of a large scale turbine blade. U.S. Pat. No. 4,415,813 is directed to apparatus for inclining the axis of rotation as a function of the force of the incident wind or as a function of the energy to be produced. U.S. Pat. No. 4,449,899 is directed to apparatus for tilting upwardly the axis of a windmill to control the rotor speed. French Patent No. 999,082 illustrates a three dimensional graphic analysis of various force relationships present in a rotor type apparatus. British Patent No. 463,037 is directed to a single bladed wind rotor having various damping devices for limiting tilt of the blade. Italian Patent No. 532,535 illustrates a spring usable in combination with a tilting hub of a wind machine. Japanese Patent No. 23,258 is directed to apparatus for rotating a turbine supporting turntable at a reduced speed whenever the turbine is rotating about its axis.

The present invention is directed to a hub assembly for securing a fan blade, which may be one piece or monolithic, to the rotatable shaft of a wind machine. The fan blade is secured intermediate a plate and a hub by bolts or the like extending therethrough. A teeter pin is journaled with the hub to extend diametrically through the hub bore and a commensurate bore in the rotatable shaft. The angle through which the fan blade may tilt about an axis coincident with the teeter pin is a function of the radial spacing between the rotatable shaft and the hub bore. The teeter pin is positionally locked to the rotatable shaft through a keying bolt which keying bolt centers the teeter pin on the shaft and hub from sliding laterally of the shaft axis.

The extremities of the teeter pin are configured to receive from a grease fitting located upon each of opposed teeter pin retaining plates a lubricant and to guide such lubricant intermediate the respective journals and the teeter pin. An annular land is located at the extremity of each teeter pin for supporting a low fruction thrust washer to bear against the respective teeter pin retaining plates to reduce wear imposed by loads exerted by the hub along the longitudinal axis of the teeter pin.

It is therefore a primary object of the present invention to provide a lubricatable teeter pin having opposed thrust washers in an hub for tiltably mounting a fan blade upon a rotatable shaft.

Another object of the present invention is to provide thrust washers for a teeter pin supporting a one piece two blade fan upon a rotatable shaft.

Yet another object of the present invention is to provide apparatus for retaining a rotatable shaft axially centered within a wear resistant hub assembly of a fan blade for a wind machine.

Still another object of the present invention is to provide wear rings for positioning a teeter pin adjacent retaining plates of an hub assembly for a fan blade of a wind machine.

A further object of the present invention is to provide a wear resistant teeter pin mounting for securing the hub assembly of a fan blade to a rotatable shaft which permits tilting of the hub assembly about an axis coincident with the teeter pin axis and yet retains the shaft concentric with the bore of the hub at the teeter pin axis.

A yet further object of the present invention is to provide an inexpensive lubricatable tiltable hub assembly for fan blades of wind machines.

A still further object of the present invention is to provide a simplified hub assembly for fan blades of wind machines which has a sealed lubrication system to reduce the corrosive effects of water and other contaminants upon the moving parts.

These and other objects of the present invention will become apparent to those skilled in the art as the description thereof proceeds.

The present invention may be described with greater specificity and clarity with reference to the following drawings in which.

Figure 1:
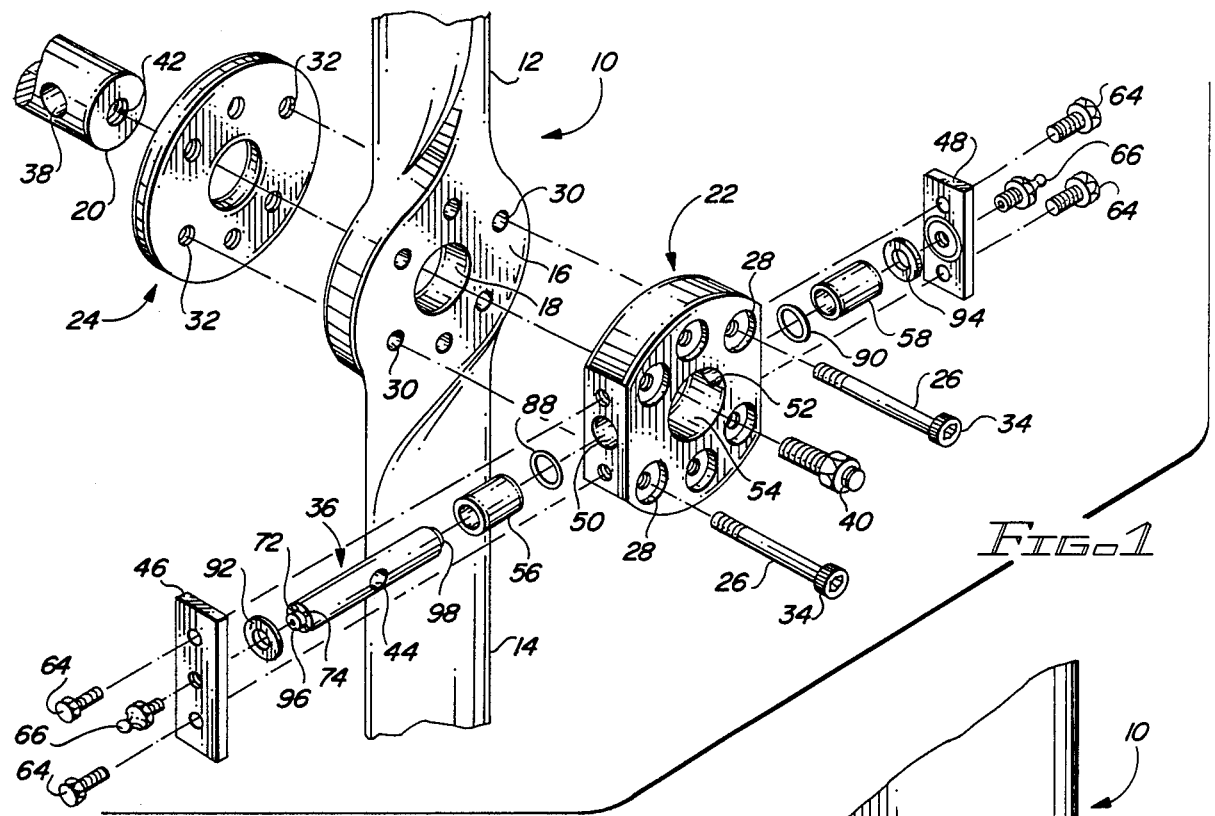
FIG. 1 is an isometric view of the major components of the hub.

Referring to FIG. 1, there is shown a fan blade of a type usable with a wind machine to circulate air in and about an orchard or the like. In the embodiment depicted, the fan blade is constructed as a unitary or monolithic structure having blades 12 and 14 formed as part of and extending in opposed directions from a center section 16. The center section includes aperture 18 for penetrably receiving the end of shaft 20. The shaft is rotatably mounted and driven by suitable motive means to provide rotary motion.

Center section 16 is secured intermediate hub 22 and plate 24 of hub assembly of the present invention by means of bolts 26 extending through the sets of coincident holes 28, 30 and 32 disposed in hub 22, center section 16 and plate 24, respectively. The holes of the sets of holes may be equiangularly located about shaft 20 in the respective components. Bolt 26 may be secured by threaded engagement with plate 24 or by nuts or other retaining means disposed at the rear surface of the plate. Preferably, each head 34 of each bolt 26 is counter-sunk in hub 22 and the bolt is threadedly engaged with hole 32 to minimize protrusion of the bolts beyond the hub assembly itself to thereby reduce wind resistance and drag.

The hub assembly is secured to shaft 20 by teeter pin 36 extending through passageway 38 of the shaft and journaled with hub 22. A keying bolt 40 threadably engages axial passageway 42 in shaft 20 and penetrably engages cavity 44 in the teeter pin with respect to the shaft. Retaining plates 46, 48 seal opposed sides of hub 22 to shield the teeter pin and journals therein against the corrosive effects of water and other contaminants.

Figure 2:
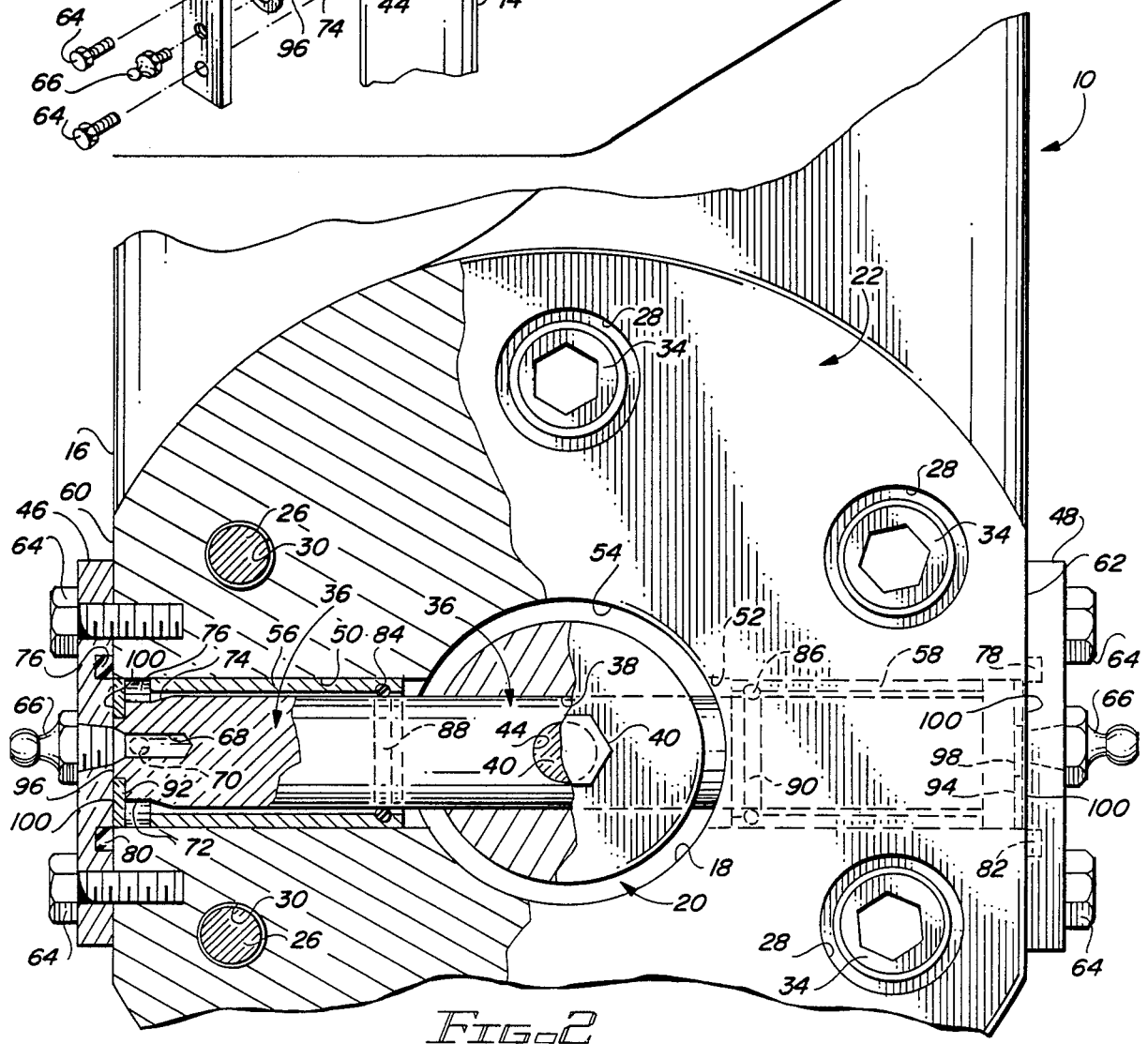
FIG. 2 is a partial cutaway of the hub structure.

Referring jointly to FIGS. 1 and 2, the mounting of teeter pin 36 within hub 22 will be described in detail. A pair of opposed diametrically oriented passageways 50, 52 extend through hub 22 orthogonal to the axis of hub bore 54. Journals 56, 58 are lodged within passageways 50, 52, respectively for journaling teeter pin 36 therein. Each journal extends from a point coincident with opposed parallel flattened surfaces 60, 62 to a point at or radially outwardly of bore 54. Radial outward sliding movement of journals 56, 58 is precluded by retaining plates 46, 48. The retaining plates may be secured to hub 22 by means, such as bolts 64.

Referring primarily to FIG. 2, the means for lubricating teeter pin 36 will be described. A grease fitting 66 is disposed in each of retaining plates 46, 48 to permit introduction of a lubricant into the respective cavities formed by the ends of teeter pin 36, journals 56, 58 and retaining plates 46, 48. Each end of teeter pin 36 includes a longitudinally aligned axial depression or cavity 68, which cavity is generally in alignment with the outflow port of the respective grease fitting. A passageway 70 extends diagramatically through the teeter pin coincident with cavity 68. Each end of the teeter pin is necked down to a cylindrical section 72. This section joins with the circumferential surface of teeter pin 36 by radially outwardly sloping annular surface 74. Accordingly, an annular cavity 76 is formed about each end of the teeter pin, which cavity is generally coincident with the opposed ends of passageway 70. Accordingly, any grease or lubricant introduced through grease fitting 66 will flow into cavity 68 and be disbursed therefrom through passageway 70 and into annular cavity 76. The lubricant flowing into the annular cavity will flow therefrom intermediate the peripheral surface of teeter pin 36 and the respective journals 56, 57 toward and to O-rings 80 and 82, respectively. These O-rings retain the lubricant and also guard against intrusion of contaminants between the teeter pin and the journals. Journals 56, 58 may be spirally grooved interiorly to encourage flow of grease or lubricant adjacent the teeter pin located therein. Annular grooves 72, 74 are formed in retaining plates 46, 48. O-rings 76, 78 are disposed in the respective grooves to seal the radially outward ends of the respective passageways. Annular grooves 80, 82 are formed approximate the radially inward ends of journals 56, 58. O-rings 84, 86 are disposed within these grooves to provide a seal between the teeter pin circumferential surface and the respective journal. Accordingly, an essentially closed cavity is developed about each opposing end of the teeter pin to prevent intrusion of water or other corrosive elements and to provide lubrication of the teeter pin.

During rotation of hub 22, substantial forces are imposed intermediate the ends of teeter pin and their respective retaining plates. Such forces, despite an adequate supply of lubricant, may cause wear upon the retaining plates and/or the end surfaces of the teeter pin. To minimize such wear, thrust washers 92, 94 may be employed. Each end of teeter pin 36 includes an annular land 96, 98 having an outer diameter commensurate with the inner diameter of the respective thrust washer 92, 94. The depth of each annular land is less than that of th thickness of the respective thrust washer; with such geometric relationship, the respective ends of the teeter pin cannot physically contact the respective retaining plates. Instead, all forces exerted by the teeter pin upon the retaining plates will be through one or the other of the thrust washers. To minimize wear of the thrust washers, the side of the thrust washer adjacent the retaining plate may be coated with any one of the many commercially available low friction coatings (100), such as a coating sold under the trademark Teflon. As an annular part of each thrust washer is adjacent grease filled annular cavity 76, all surfaces of the thrust washers will be lubricated to minimize wear between the thrust washers and the surfaces in contact therewith, such as a part of the ends of teeter pin 36, an annular segment of passageways 50, 52 and retaining plates 46, 48.

It may be readily perceived that installation and removal of fan blade 10 is easily performed for purposes of maintenance or repair. That is, fan blade 10 with hub 22 and plate 24 attached thereto is lifted into penetrable engagement with shaft 20. Teeter pin 36 is inserted within hub 22 to penetrably engage passageway 38. Engaging keying bolt 40 with the teeter pin positionally locks the teeter pin with respect to the shaft. Attachment of retaining plates 46, 48 locates hub 22 and attached fan blade 10 with respect to teeter pin 36. Removal of fan blade 10 may be effected by reversing the above process.

While the principles of the invention have now been made clear in illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. Apparatus for reducing the wear and maintaining lubricated a fan blade hub supported upon a rotatable shaft, said apparatus comprising in combination:
   (a) a teeter pin for supporting the hub upon the shaft;
   (b) a pair of aligned spaced apart journals diametrically disposed within the hub for receiving opposed ends of said teeter pin;
   (c) a pair of retaining plates attachable to the hub, one retaining plate of said pair retaining plates being located proximate the outer radial extremity of each journal of said pair of journals;
   (d) an annular land disposed at each end of said teeter pin;
   (e) a thrust washer mounted upon each of said lands for supporting the respective end of said teeter pin against the respective one of said pair of retaining plates;
   (f) means disposed in each retaining plate of said pair of retaining plates for introducing a lubricant;
   (g) means disposed in each end of said teeter pin for urging the lubricant from said introducing means into the respective journal of said pair of journals to lubricate in a direction radially inwardly the journaled part of said teeter pin; and
   (h) seal means disposed proximate the radially inward end of each journal of said pair of journals and adjacent said journaled teeter pin for restraining radially outward flow of foreign matter intermediate said teeter pin and each journal of said pair of journals;

whereby, wear between said teeter pin and said pair of retaining plates and said journals is reduced while inhibiting incursion of foreign matter intermediate said teeter pin and said pair of journals.

2. The apparatus as set forth in claim 1 wherein said urging means comprises a longitudinally aligned depression and a passageway extending laterally from said depression to the circumferential surface of said teeter pin.

3. The apparatus as set forth in claim 2 wherein each end of said teeter pin includes a necked down section.

4. The apparatus as set forth in claim 3 wherein each end of said teeter pin includes a sloping annular surface interconnecting said necked down section with the circumferential surface of said teeter pin.

5. The apparatus as set forth in claim 4 wherein said passageway extends diametrically across said teeter pin through said depression.

6. The apparatus as set forth in claim 1 wherein the height of each of said lands is less than the thickness of the respective one of said thrust washers.

7. The apparatus as set forth in claim 6 wherein said urging means comprises a longitudinally aligned depression extending through said land and a passageway extending laterally from said depression to the circumferential surface of said teeter pin.

8. The apparatus as set forth in claim 7 wherein said thrust washer includes a coating of low friction material adjacent the respective one of said pair of retaining plates.

* * * * *